United States Patent [19]
Pruett

[11] Patent Number: 6,116,578
[45] Date of Patent: Sep. 12, 2000

[54] METHOD FOR INSERTING A CABLE IN A DUCT

[76] Inventor: Phillip E. Pruett, 12417 Hwy. 178, Bakersfield, Calif. 93306

[21] Appl. No.: 08/941,991

[22] Filed: Oct. 1, 1997

[51] Int. Cl.[7] .................................................. B65H 59/00
[52] U.S. Cl. ........................................................ 254/134.4
[58] Field of Search .................. 254/134.3 R, 134.3 FT,
254/134.4; 15/104.31, 104.33; 184/15 R;
198/493, 500; 406/47, 49, 193, 117; 405/171;
175/65

[56] References Cited

U.S. PATENT DOCUMENTS 5,156,376  10/1992  Spicer .
5,456,450  10/1995  Reeve et al. ........................ 254/134.4
5,503,370   4/1996  Newman et al. .
5,732,934   3/1998  Sano et al. ........................... 254/134.4

Primary Examiner—Robert C. Watson

[57] ABSTRACT

The present invention describes a method and apparatus for inserting a cable, in a duct, tube, or other hollow, elongated structure which can be sealed at the point of insertion of the cable to create a pressure housing. The invention comprises positioning a tube in the well, positioning a source of cable adjacent the well, and inserting the cable through a pressure housing into the tubing by means of polymer foam mixture under pressure. A mechanical force may be employed on the fiber optic to overcome any resistance created by the lubrication fitting at the pressure housing. The foam is in the form of a concentrate, which, when mixed with a liquid source and air, expands significantly when injected into the capillary. Due to such expansion, the foam adheres to the surface of the cable, creating a viscous drag against the cable in the direction of pressure flow.

6 Claims, 3 Drawing Sheets

METHOD FOR INSERTING A CABLE IN A DUCT

FIELD OF THE INVENTION

This invention generally pertains to methods and apparatus for the installation of cable in ducts and tubing, and particularly to the installation of such cable utilizing the injection of a fluid under pressure, and more particularly a method and apparatus for the installation of such cable utilizing the pressure of liquid foam under pressure.

BACKGROUND OF THE INVENTION

As used herein, the term "cable" means any manner of wire or cable, now known or later developed, including cable for the conduction of electromagnetic and/or optical energy such as, fiber optics, electrical conductive wire or other flexible material. The term "duct" means any enclosed canal, conduit, duct, tubing or other enclosed stricture that may be sealed and in which cable may typically be inserted or laid.

There exists a need for an economical and efficient process for installing cables of 3,000 feet or more in length in vertical ducts and in tubing previously installed in pipelines and well casings in gas, oil and geothermal fields. The cable typically provides means for monitoring the conditions at distant locations or in wells at significant depths below the surface. There are various methods that have been used to install cable in ducts. One such method is to cause a fluid such as water to flow through the duct, placing a drogue on the cable, then inserting the cable into the fluid flow such that such fluid flow will propel the cable through the duct by means of pressure against the drogue. Typically such methods are employed to insert the cable in horizontal duct where the cable will exit from a duct at a location downstream from the entry point. In situations where is desirable to insert the cable into a well casing installed in a gas, oil, or geothermal well, it is not uncommon for weights to be attached to the distal end of the cable in order to counter the pressure opposing the insertion. A problem with this method of insertion is that the larger the size of the cable, and the more weight is required in order to overcome the opposing pressure in the well, which weights can affect the structural integrity of the cable.

U.S. Pat. No. 5,156,376 describes a method of installing cable in pipelines, the cable having a syntactic foam pressure resistance sheath, inlet and outlet tubes in the pipeline, the cable having flexible cup members which provide viscous drag on the cable, and then extracting the cable from the downstream outlet. The foam surface of the cable is intended to provide a surface that would provide some dragging force with the flow of fluid, however, the major impetus for the cable in the pipeline being the viscous drag on the cup members by the fluid flowing in the pipeline.

Another example of the prior art for well casing applications is described in U.S. Pat. No. 5,503,370 wherein a cable is inserted into a reel coiled tubing by means of a capstan drive within a pressure housing. The tubing is then attached to other tubing being installed in a well casing, or fed down independently into the casing. The major drawback to this method is that insertion of the cable occurs on the surface, and the method does not demonstrate any advantages over the prior art in inserting cable in a duct or tube previously installed in a well casing wherein there exists a pressure within the well casing opposing the insertion of the cable.

None of the prior art or referenced patents disclose a method and apparatus for economically and efficiently inserting a flexible cable in a duct or tube wherein there is a pressure in the tube from opposing forces.

SUMMARY OF THE INVENTION

The present invention describes a method and apparatus for inserting a cable, in a duct, tube, or other hollow, elongated structure which can be sealed at the point of insertion of the cable to create a pressure housing. The invention comprises positioning a tube in the well, positioning a source of cable adjacent the well, and inserting the cable through a pressure housing into the tubing by means of a foam mixture under pressure. A mechanical force may be employed on the fiber optic to overcome any resistance at the pressure housing. The foam is in the form of a concentrate, which, when mixed with a liquid source and air, expands significantly when injected into the capillary tubing. Due to such expansion, the foam adheres to the surface of the cable, creating a viscous drag against the cable in the direction of pressure flow.

The invention may be better understood by reference to the drawings and the detailed description of the invention that follows.

DETAILED DESCRIPTION

Figure 1:
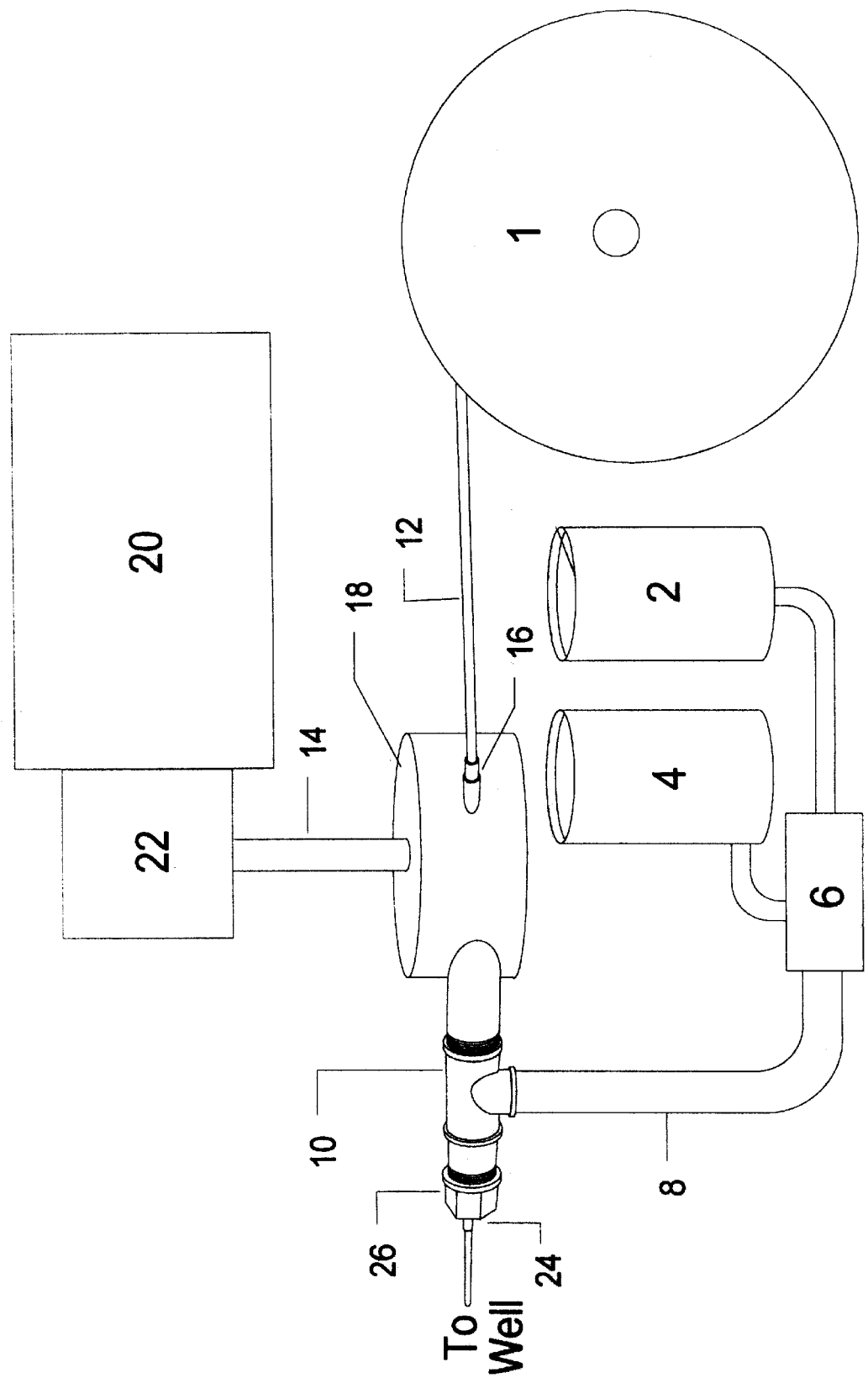
FIG. 1 is a schematic drawing of the apparatus of the invention.

For the purposes on the preferred embodiments, the invention will be discussed in terms of inserting a fiber optic strand, or fiber optic bundle, (hereinafter, for the purposes of the inventions both strand and bundle simply referred to as a "fiber optic"), in a capillary tube. The capillary tube may be on a cable reel, laid out on the surface, laid horizontally in a conduit, or the capillary tube may previously have been installed vertically in the casing of a wellbore. A cable foam injection system can be described by reference to FIG. 1, which depicts a fluid container 2 for containing the fluid that mixes with a foam agent prior to injection. Foam agent container 4 stores a selected amount of a foaming agent. High-pressure pump 6 withdraws both fluid and foam agent from their respective containers (2, 4) and provides the pressure to insert the fiber optic 12 in capillary tubing. High-pressure hose 8 carries the mixture of loam agent and fluid under pressure to injection head 10. Injection head 10 defuses the high-pressure mixture of fluid and foaming agent prior to injection of the fluid into the tube. Fiber optic 12 is pulled from its source 1 by means of a power drive 14, drive motor 20 and gear box 22. The power drive 14 impels the cable into lubricator 16, and thereby into pressure housing 18. Upon injection into injection head 10, the fluidized foam expands in volume, adhering to the surface of fiber optic 12. The pressure of injection is in the order of 20,000 psi. As fiber optic 12 is impelled into capillary tubing 24, sealingly attached to injection head 10 by pressure fitting 26, the pressurized foam mixture adheres to the surface of fiber optic 12 and pulls it along the length of lubricator 16 and into capillary tubing 24.

Figure 2:
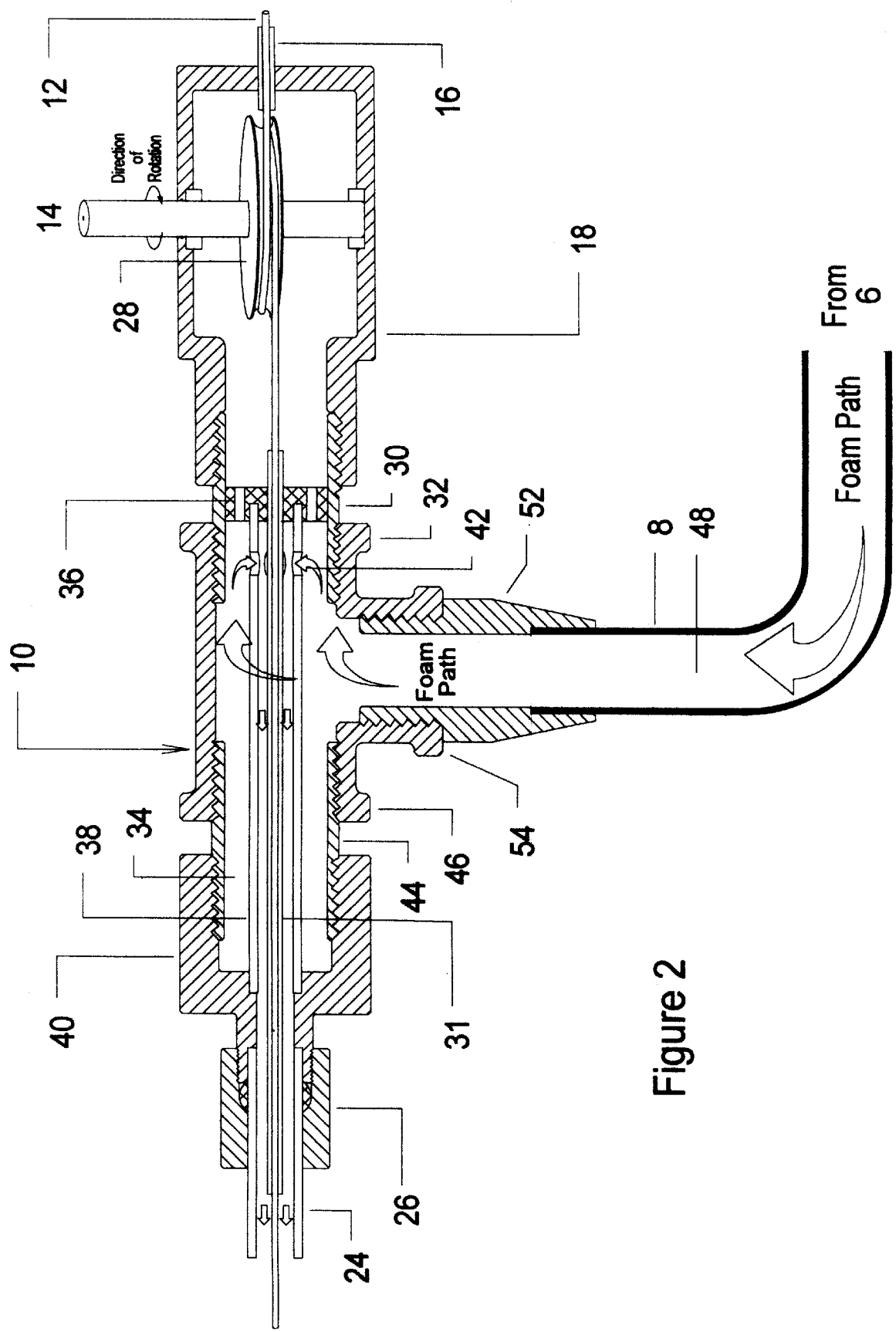
FIG. 2 is a cut-away view of the insertion apparatus of the preferred embodiment.

The invention is more particularly described by reference to FIG. 2, wherein a fiber optic 12 of 0.1 mil diameter is inserted through lubricator 16 into pressure housing 18 wherein it is directed around a variable speed capstan drive 28. Capstan drive 28 serves to remove opposing force against fiber optic 12, allowing the fiber to free-flow into injection head 10. Pressure housing 18 is threaded to receive ½ inch bulkhead bushing 30, which sealingly mates with a similarly threaded flange 32 in injection head 10. Injection head 10 is a ½ inch tee, cylindrical in shape, the interior of which defines a mixing chamber 34, extending the length of injection head 10. Injection head 10 provides a pathway for injection lubricator 31, constructed of 0.094 inch outside diameter stainless steel tubing, and fiber 12. Injection head 10 also provides a pathway for receipt of pressurized foam from pump 6. Bulkhead bushing 30 is formed to have pressure equalizing ports 36 to equalize pressure between chamber 34 and pressure housing 18, thereby facilitating the travel of fiber 12 along the length of lubricator 16 and through mixing chamber 34. Pressure tubing 38, constructed of a ¼ inch stainless steel, transverses the length of injection head 10, sealingly mating with bulkhead bushing 30 and with high-pressure connector crossover 40, providing a pathway for injection lubricator 31 and fiber optic 12, and through which high-pressure connector crossover 40, the foam mixture will be injected into capillary tubing 24. Pressure tubing 38 has at least one access port 42 providing a pathway for the foam mixture from mixing chamber 34 into pressure tubing 38. Injection lubricator 31 extends through bulkhead bushing 30 and traverses the length of injector head 10, terminating at a point interior to capillary tubing 24, in to which tubing 24 fiber optic 12 is lo be inserted.

Capillary tubing 24 is fed through ¼ inch high-pressure connector 26, which sealingly, threadedly mates to ¼ by ½ inch high-pressure connector crossover 40. High-pressure collector crossover 40 threadedly mates to ½ inch injection bushing 44, which in turn threadedly mates to flange 46 of injection head 10.

A third orifice 48 in mixing chamber 34 is adapted with a pressure fitting 52 for receipt of high pressure hose 8 and provides a pathway for the foam agent/fluid mixture into mixing chamber 34. Pressure fitting 52 sealingly, threadedly mates with flange 54 in injection head 10. In this exemplary embodiment, a 10 horsepower pump 6, producing up to 10,000 psi is used to mix fluid and the foaming agent and to pump such mixture through hose 8 to the mixing chamber 34. Injection head 10 diffuses the foam mixture and the foam mixture is forced through access holes 42 into pressure tubing 38. The foam mixture is directed into capillary tubing 24 through which fiber optic 12 is being directed. The foam mixture expands around fiber optic 12, with the adhesive properties of the foam creating a positive drag force against the surface of fiber optic 12 and propelling fiber optic 12 through capillary tubing 24 to a selected depth, or to a selected distance into a duct. The high-pressure connectors used in this exemplary embodiment are of standard manufacture and use in the industry. In this instance Swedgelock connectors were employed, however, any equivalent high-pressure connectors could be equivalently be used.

Figure 3:
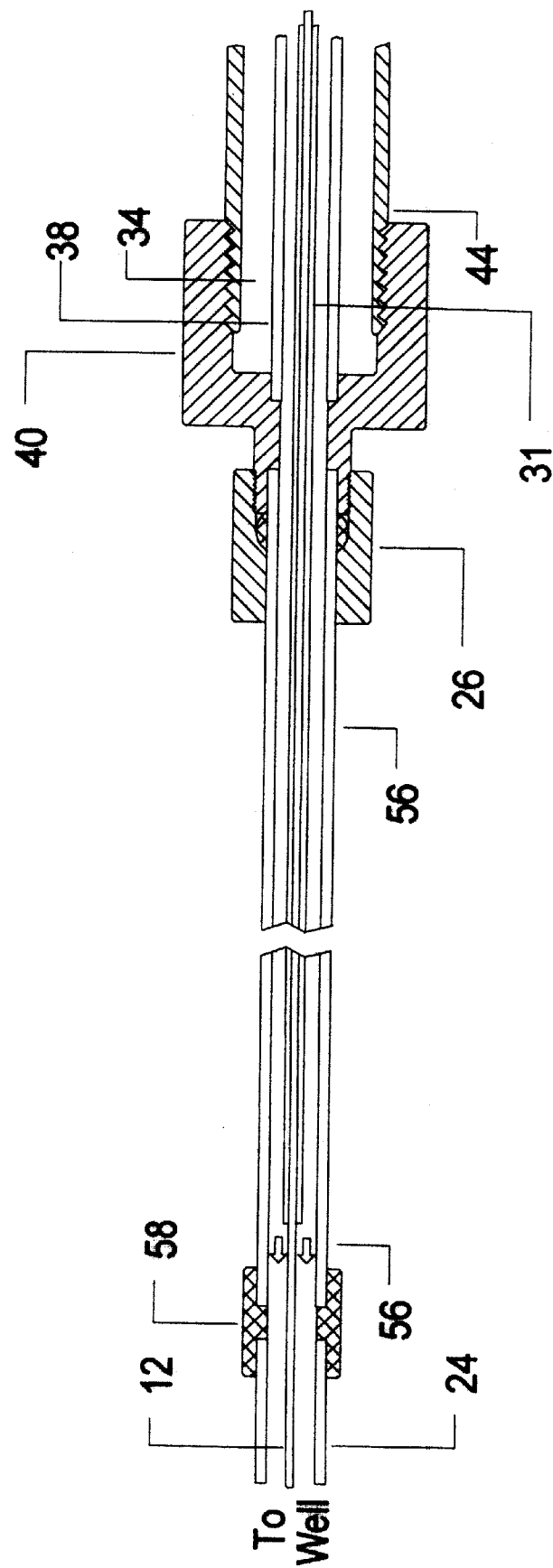
FIG. 3 is a cut-away view of a second insertion means of the preferred embodiment.

In some installations where the pressure opposing insertion of a fiber optic is greater, it may be advantageous to use an injection leader to facilitate the injection of the fiber optic. The injection leader will ensure that there is enough foam in contact with the surface of the fiber optic to pull the fiber optic into the capillary, or along a duct. Referring to FIG. 3, the apparatus of FIG. 2 is similarly employed, except that instead of capillary tubing 24 feeding directly into high-pressure connector 26, injection leader 56 is sealingly fed into high-pressure connector 26. At its distal end, injection leader 56 sealingly mates with injection high-pressure coupler 58, which in turn sealingly mates with capillary tubing 24, thereby creating a pathway for fiber optic 12 and the injected liquid foam.

Injection leader 56 is selected to have a length l, which length l is selected based on the relative friction of the capillary tube into which the fiber optic is to be inserted. The more the friction in capillary tubing 24, the longer the length of injection leader 56, which may vary from 5 feet to over 200 feet. Length l may be calculated by those of ordinary skill in the art once the friction of the tube and the injection pressures are known.

In the preferred embodiment, a capstan drive is employed to impel fiber optic 12 if an insertion force is required to overcome the pressures from the lubricator opposing such insertion. Other means of impelling fiber optic 12 may similarly be employed, such as caterpillar drive, or rollers, and such other means known in the industry.

Differing cables have various surface coatings, requiring the appropriate selection of a foam that will adhere to a particular surface. The surface of fiber optic cables differ based on the environment to which the fiber optics is to be subjected. For example, fiber optics used in low temperature, low corrosion applications, in the region of 0° F. to 150° F. are typically coated with Acralate. Fiber optics for environments with temperatures in the range of 150° F. to 400° F. are coated with Teflon, and fiber optics for environments with temperatures in the range of 400° F. to 800° F.+ are coated with Polyamide.

Its has been determined that a fiber strand, when injected by the process of the invention, tends to remain in the center of the capillary based on the principle of center core flow due to the higher viscous drag of the foam against the interior surface of the capillary. This phenomenon suggests many benefits, not previously obvious, that may be achieved by selection the appropriate foam agent. One of such benefits is the capability of constructing a specialized, encapsulated cable on site. It is now possible, with the concepts of the invention, to select a particular duct, or tubing, and type of cable, fabricate the cable on site, and insert the cable in a wellbore by any conventional means. For instance, it may be desirable to fabricate an electrical conductor encapsulated within plastic tubing and insulated for the length of the tubing. By proper selection of a foam agent with properties of being a fast-setting electrical insulator, as well as adhering to the surface of the electrical conductor, the electrical conductor may be inserted on a reel on the surface and, upon setting of the liquid foam, installed in the wellbore. Concomitantly, the duct may already be in place, and the specialized liquid foam and cable inserted in the duct. Other benefits may include the selection of a foam agent such that the liquid foam provides protection for the cable against corrosive elements, or to provide structural support for the cable, thereby enabling the cable to bear a load without external support, etc.

The foaming agent of this exemplary embodiment was a 20% solution of a polymer commonly known as 7139Plus, manufactured by Malchem, however, any polymer based foaming agent having similar properties may equivalently be used. Such polymers are commonly available through numerous distributors well known as suppliers of chemical products. Concomitantly, it is possible to use polymers that have properties that additionally enhance the performance of cable insertion. For example, the cable may be coated with a polymer having the property of being anionical. By using a foaming agent having the property of being cationical, then the cable insertion is faster, and more efficient. The insertion may be controlled by proper selection of the charge characteristics of the polymers. The polymer for coating the cable may be selected with a charge of one polarity. A foaming agent may then be selected with a charge characteristic opposite to that of the coating polymer, which maximizes the efficiency of the cable insertion. She insertion of the cable may additionally be controlled by selecting polymers with differing molecular weight characteristics.

I claim:

1. A method of inserting a cable in a conduit, the method comprising:
   (a) pulling a cable from a source; and
   (b) inserting the cable in the conduit by means of pressure injecting a liquid foam around the cable, the liquid foam selected to adhere to the surface of the cable.

2. The method of claim 1 wherein step (b) includes coating the cable with a polymer having selected characteristics.

3. The method of claim 2 wherein the foaming agent has characteristics which are different from the characteristics of the coating polymer.

4. The method of claim 1 wherein step (b) includes:
   (i) directing the cable into a pressure housing;
   (ii) guiding the cable into an injection head;
   (iii) combining the cable with a liquid foam in the injection head, the liquid foam injected into the injection head under pressure; and
   (iv) injecting the combination of cable and liquid foam into the duct.

5. The method of claim 4 wherein step (b) includes coating the cable with a polymer having selected characteristics.

6. The method of claim 5 wherein the foaming agent has characteristics which are different from the characteristics of the coating polymer.

* * * * *